United States Patent [19]

Schneider

[11] Patent Number: 5,097,862
[45] Date of Patent: Mar. 24, 1992

[54] ACCUMULATOR WITH A VALVE CONNECTED FLOAT

[75] Inventor: Jeffry A. Schneider, Katy, Tex.

[73] Assignee: Accumulators, Inc., Houston, Tex.

[21] Appl. No.: 621,663

[22] Filed: Dec. 3, 1990

[51] Int. Cl.$^5$ .................. F16L 55/04; F16K 31/22
[52] U.S. Cl. ..................... 137/207; 137/192; 137/433
[58] Field of Search ............ 137/207, 192, 433, 399, 137/516.29

[56] References Cited

U.S. PATENT DOCUMENTS

| | | | |
|---|---|---|---|
| 3,319,658 | 5/1967 | Mercier | 138/30 |
| 3,548,868 | 12/1970 | Mullaney | 137/516.29 |
| 4,176,681 | 12/1979 | Mackal | 137/516.29 |
| 4,278,105 | 7/1981 | Koomey | 137/207 |
| 4,294,288 | 10/1981 | Murthy | 138/30 |
| 4,403,629 | 9/1983 | Vries | 138/31 |
| 4,518,005 | 5/1985 | Allewitz | 137/207 |

Primary Examiner—Alan Cohan
Attorney, Agent, or Firm—Fulbright & Jaworski

[57] ABSTRACT

A liquid-gas accumulator having a housing with a top gas port and a bottom liquid port. A spring-loaded, normally open valve is positioned in the liquid port and a buoyant float is rigidly connected to the valve element for controlling the opening and closing of the valve in response to the liquid level in the housing. A resilient seal may be provided between the float and the valve element positioned to seat around the valve as the valve closes thereby providing a secondary seal.

4 Claims, 1 Drawing Sheet

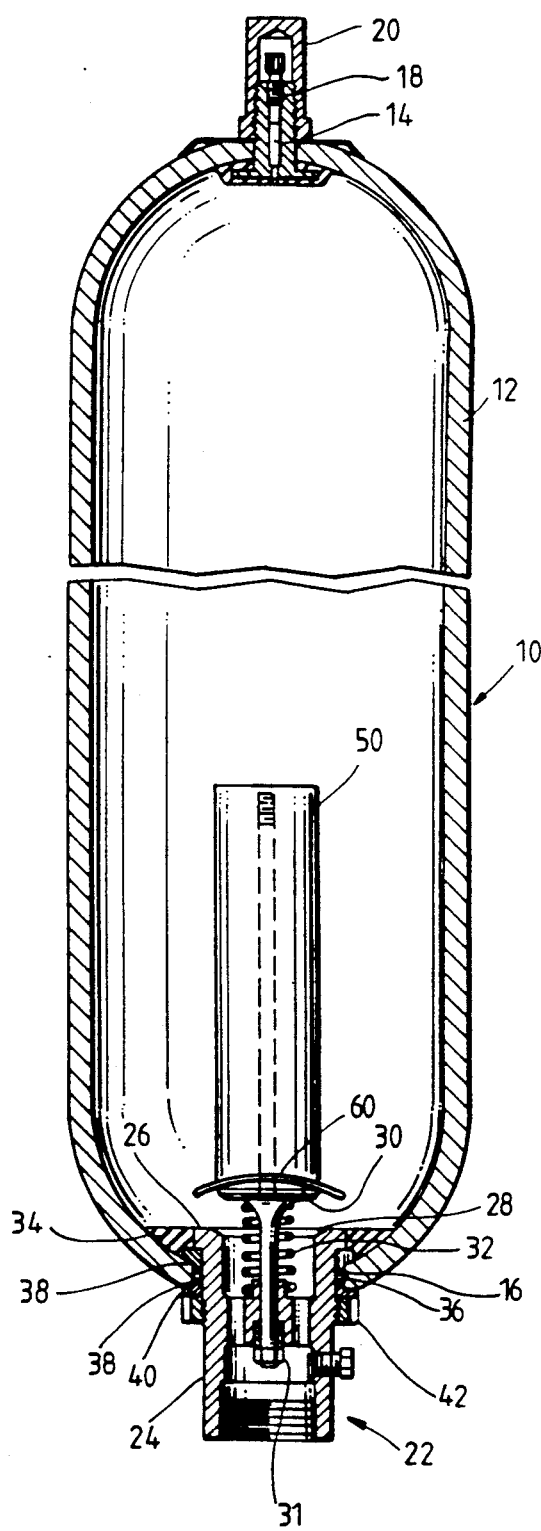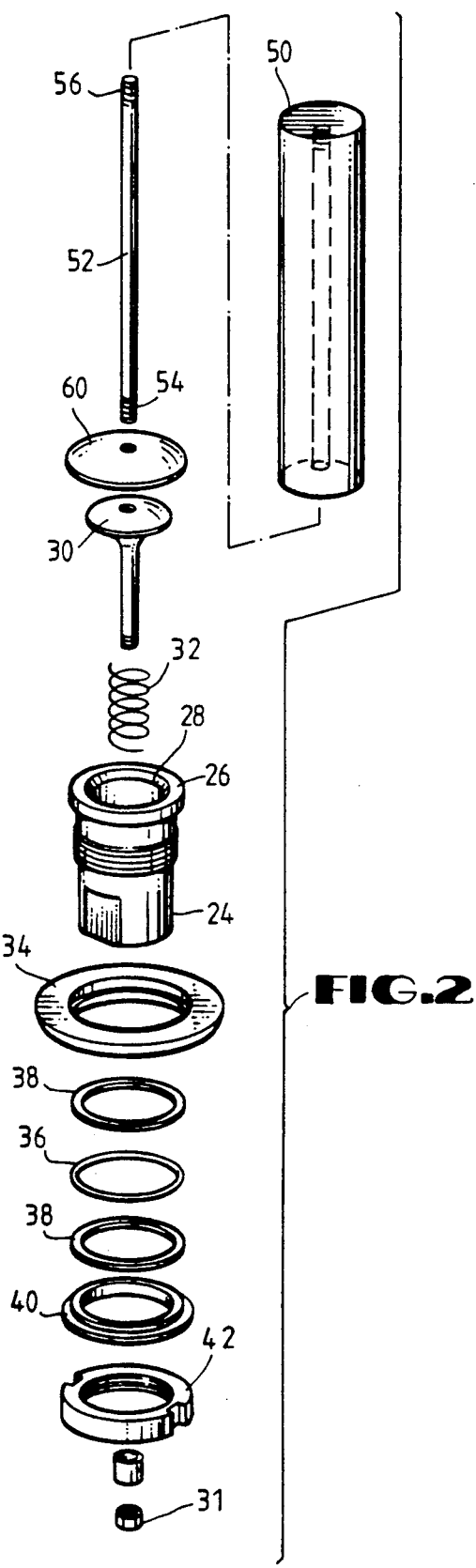

ACCUMULATOR WITH A VALVE CONNECTED FLOAT

BACKGROUND OF THE INVENTION

It is well known to provide a liquid-gas accumulator to provide a supply of hydraulic fluid at a high flow rate when the accumulator is actuated. Various types of accumulators have been used in the past such as bladder types and guided float types, some of which actuate a spring-loaded liquid inlet-outlet valve. In particular, while various guided float types have been used, such floats are guided by the housing, cages, or rods, and all have the possibility of cocking or sticking and malfunctioning.

The present invention is directed to a liquid-gas accumulator having a buoyant float which is rigidly connected to the inlet-outlet valve. This eliminates any need for stabilizing guides or walls. In addition, the present float does not "float" in the sense that it travels with the liquid level, but uses buoyancy only to open the valve and then remains submerged until the liquid is released at which time the weight of the float will close the valve. In addition, the present invention includes an additional seal to overcome the problem of gas escaping from the liquid port as the liquid level inside the accumulator nears the bottom.

The present invention is directed to a liquid-gas accumulator having a housing with a top gas port and a bottom liquid port. A gas charging valve is positioned in the top port for admission of high pressure gas. A valve is positioned in the liquid port. The valve includes a sleeve having a first end which includes a valve seat, and a valve element coacting with the seat for opening and closing the Port. Spring means yieldably urges the valve to an open position. A buoyant float is rigidly connected to the valve element for controlling the opening and closing of the valve in response to the level of liquid in the housing. The buoyant float does not require guides.

Yet a further object of the present invention is the provision of a resilient seal connected between the float and the valve element positioned to seat on the first end of the sleeve as the valve closes thereby providing a second seal. This second seal allows the gas precharge in the accumulator to be sealed without requiring a large amount of liquid to remain in the accumulator to prevent the gas from escaping.

Yet a still further object of the present invention is wherein the valve is a poppet valve and the buoyant float and the resilient seal are connected to the top of the poppet.

Yet a still further object of the present invention is wherein the resilient seal extends outwardly beyond the periphery of the poppet valve for sealing and preventing the escape of the gas precharge with a minimum of liquid.

Other and further objects, features and advantages will be apparent from the following description of a presently preferred embodiment of the invention, given for the purpose of disclosure, and taken in conjunction with the accompanying drawing.

BRIEF DESCRIPTION OF THE DRAWING

FIG. 1 is an elevational view, in cross section, of the present invention showing the accumulator in an open position, and FIG. 2 is an enlarged exploded perspective view of the valve and float assembly.

DESCRIPTION OF THE PREFERRED EMBODIMENT

Referring now to the drawing and particularly to FIG. 1, the reference numeral 10 generally indicates the liquid-gas accumulator of the present invention having a housing 12 which may be of any suitable configuration, such as cylindrical or spherical, and is here shown as being cylindrical.

The housing 12 includes a top gas port 14 and a bottom liquid port 16. The top port 14 is adapted to receive a conventional high pressure gas charging valve 18 which may include a protective valve cap 20.

A valve assembly generally indicated by the reference numeral 22 (FIGS. 1 and 2) is provided positioned in the liquid port 16. The valve 22 includes a sleeve 24 having a first end 26 which includes a valve seat 28. A valve element such as a poppet valve 30 attached to a nut 31 coacts with the seat 28 for opening and closing the port 16. Spring 32 yieldably urges the valve element 30 to a normally open position. Various other components are provided for securing and sealing the valve assembly 22 in the port 16 including an anti-extrusion ring 34, an O-ring 36, backup ring 38, a spacer 40, and a lock nut 42.

Generally, the accumulator 10 includes a supply of hydraulic fluid and a precharge gas, usually nitrogen, for providing high pressure hydraulic fluid at the outlet of the valve assembly 22 upon actuation of a downstream valve (not shown). The above recited structure is generally conventional and various types of bladders or guided floats have been used in the past to actuate and close the valve assembly 22 to prevent the escape of the precharged gas from the housing 12 when the liquid level within the housing 12 becomes low.

Referring still to FIGS. 1 and 2, a buoyant float 50 is provided which is rigidly connected to the poppet valve 30 by any suitable means, such as a rod 52 having a first end 54 threadably connected to the top of the poppet 30 and a second end 56 extending into and threadably connected to the float 50. The float 50 is preferably a solid material such as a syntactic foam buoyancy material and one sold under the trademark "Eccofloat" is satisfactory. The float 50 may be of any suitable shape, but is preferably a cylinder having a diameter no greater than the outside diameter of the port 16 so that the float 50 may be installed into and removed from the port 16 with the valve assembly 22.

The float 50 does not "float" in the liquid in the housing 12 in the sense that it travels with the liquid level of the liquid. However, the float 50 is buoyant and its buoyancy assists in opening the poppet valve 30 from the valve seat 28. Thereafter, the float 50, because it is rigidly connected to the poppet 30 becomes submerged as the liquid rises in the housing 12. When the liquid is released through the valve assembly 22, the weight of the float 50, as it loses its buoyancy, overcomes the spring 32 at which time the poppet 30 will seat on the valve seat 28 and prevent the escape of the gas pressure by the weight of the float 50. Therefore, the buoyancy of the float 50 since it is fixedly connected to the top of the poppet valve 30 does not need any stabilizing guides such as the sidewalls of the housing or guide rods, all of which create friction and possible cocking and sticking.

In addition, a secondary seal 60 is provided which is positioned on top of the poppet valve 30 and between the poppet valve 30 and the buoyant float 50. The resilient seal may be made out of any suitable material such as rubber or "VITON" and extends outwardly beyond the periphery of the poppet valve 30 so as to engage and seat on the end 26 of the sleeve 24 outside of the valve seat 28. The secondary seal 60 therefore provides a dual seal which allows the gas precharge in the housing to be sealed in the housing 12 as the accumulator is emptied of liquid. The secondary seal 60 will seat and prevent the escape of pressurized gas in the housing 12 without requiring a layer of liquid as in other types of accumulators.

It is to be noted that the valve assembly 22 and float 50 can be installed in any type of accumulator shell, that is, standard, top repairable, full open top, etc. In addition, the valve assembly 22 and float 50 can be installed in previously manufactured bladder, float, and non-separator types of units. And, if desired, the float 50 can be unscrewed from the valve assembly 22 along with the threaded rod 52 and the accumulator 10 can be converted to a bladder type unit.

In operation, normally, the weight of the float 50 will overcome the spring 32 and move the poppet valve element 30 onto the seat 28. However, with liquid in the housing 12, the buoyancy of the float 50 overcomes its weight and the poppet 30 will open the valve 22. After the poppet 30 is in the open position, the fixed float 50 will become submerged as the liquid increases in the housing 12. However, when the liquid is released, the weight of the float 50 will overcome the spring 32 causing the poppet to seat on the seat 28 and cause the secondary seal 60 to seat on the end 26 of the sleeve 24.

The present invention, therefore, is well adapted to carry out the objects and attain the ends and advantages mentioned as well as others inherent therein.. While a presently preferred embodiment of the invention is given for the purpose of disclosure, numerous changes in the details of construction and arrangement of parts, will readily suggest themselves to those skilled in the art and which are encompassed within the spirit of the invention and the scope of the appended claims.

What is claimed is:

1. A liquid-gas accumulator comprising,
    a housing having a top gas port and a bottom liquid port,
    a gas charging valve positioned in the top port for admission of high pressure gas,
    a poppet valve assembly positioned in the liquid port, said valve including a sleeve having a first end which includes a valve seat, a valve element guided in the sleeve and coacting with the seat for opening and closing the port, and spring means yieldably urging the valve to an open position, and
    a buoyant float rigidly connected only to the poppet valve element for controlling the opening and closing of the valve in response to the level of liquid in the housing.

2. The apparatus of claim 1 including,
    a resilient seal between the float and the valve element positioned to seat on the first end of the sleeve as the valve closes thereby providing a second seal.

3. The apparatus of claim 2 wherein,
    the valve is a poppet valve and the buoyant float and the resilient seal are connected to the top of the poppet.

4. The apparatus of claim 3 wherein the resilient seal extends outwardly beyond the periphery of the poppet valve.

* * * * *